Patented May 14, 1946

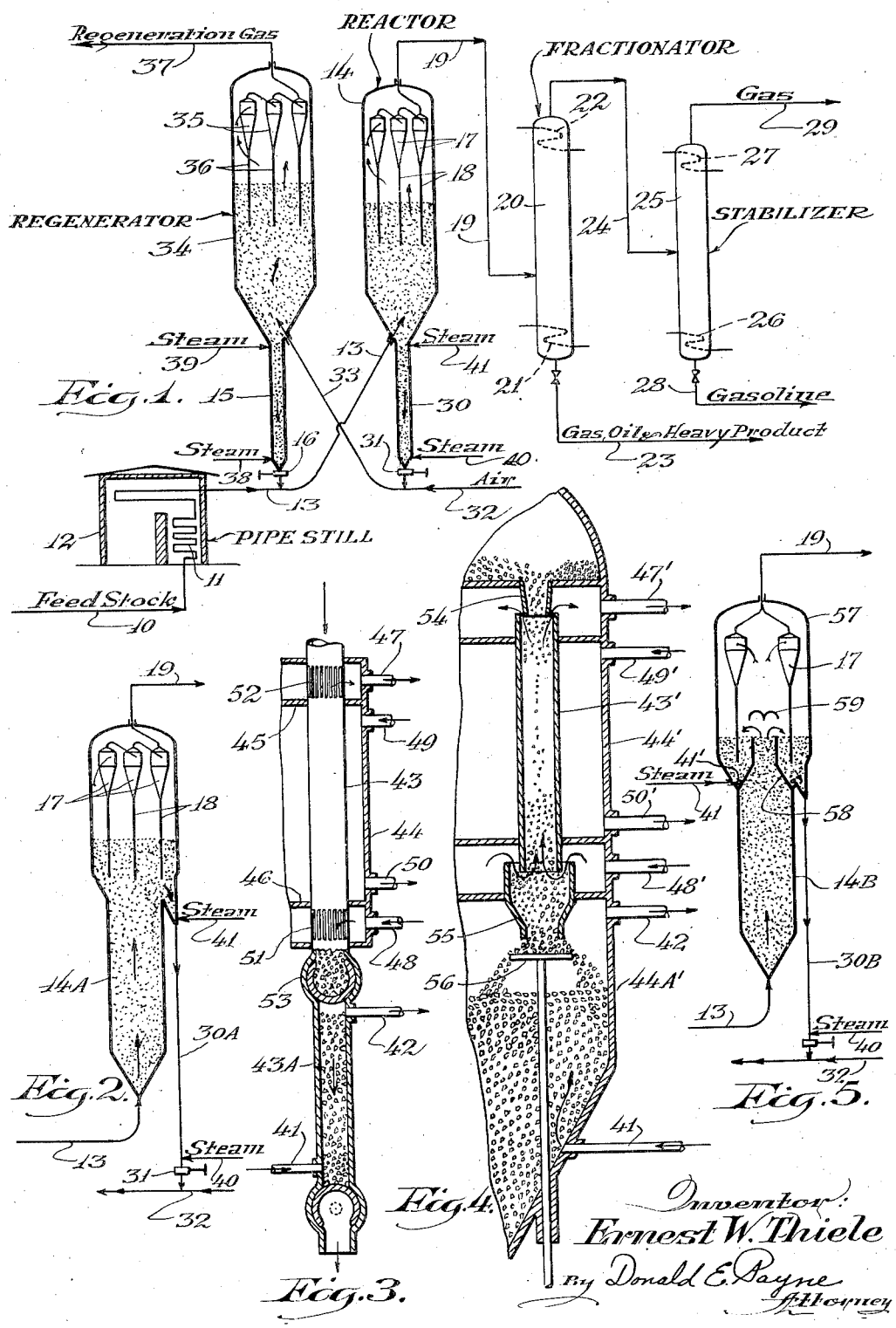

2,400,176

UNITED STATES PATENT OFFICE 2,400,176

CATALYTIC CONVERSION

Ernest W. Thiele, Chicago, Ill., assignor to Standard Oil Company, Chicago, Ill., a corporation of Indiana Application September 20, 1941, Serial No. 411,703

14 Claims. (Cl. 196—52)

This invention relates to catalytic conversion and it pertains more particularly to the catalytic cracking or dehydrogenation of petroleum oils for the production of high quality motor fuel. This is a continuation-in-part of my copending application Serial No. 236,152 filed October 21, 1938, and which issued as Patent No. 2,312,006 on February 23, 1943.

An object of my invention is to provide a method and means for supplying the heat required for catalytic cracking or dehydrogenation and for controlling and utilizing the heat generated by catalyst regeneration. Heretofore, catalytic conversion processes of this type have required expensive and complicated apparatus for maintaining closely controlled conversion temperatures and for preventing overheating during the regeneration step; an object of my invention is to provide a method and means for avoiding such complicated and expensive apparatus, i. e., to effect a simplification of catalyst chamber design and catalyst handling and control apparatus.

In catalytic conversion processes it is extremely important to avoid channeling and "dead spaces" in the catalyst mass. This is not only true of fixed bed systems but it is true of moving bed systems and of the powdered catalyst or fluid type catalyst systems. An object of my invention is to provide a method and means for employing simple cylindrical catalyst chambers in which such channeling may be avoided. A further object is to provide an improved means for insuring the desired catalyst flow in catalyst chambers and in other parts of the system and to prevent catalyst from sticking or bridging in tubes, pipes, or valves.

A further object of the invention is to obtain larger yields per pass of cracked gasoline, smaller gas yields and higher antiknock qualities in the finished gasoline than have heretofore been obtainable in the case of catalytic cracking. A further object is to obtain increased efficiency and higher conversion rates in dehydrogenation processes. Catalysts are most effective at the time they initially go on-stream or shortly thereafter. The catalyst effectiveness then gradually diminishes until it reaches the point at which regeneration becomes necessary. An object of my invention is to regenerate the catalyst at short intervals so that it will operate with maximum effectiveness and at the same time to incorporate with the catalyst a heat storing medium which supplies the heat required for catalytic conversion and which absorbs, during the regeneration step, a substantial amount of the heat generated by the burning of carbonaceous materials from the catalyst during the regeneration step. My object is to relate the size, amount and nature of heat retention material with the conversion conditions in an endothermic catalytic reaction so that the heat conductivity of the material and its specific heat, will make it continuously effective in a continuous conversion process.

A further object of the invention is to simplify a continuous catalytic conversion system and to increase its efficiency. One example of such continuous system is the moving bed system wherein granular catalyst having a particle size of the order of ⅛ inch is continuously introduced at the top of a reactor and continuously withdrawn from the base thereof so that the reactor remains substantially filled with a constantly changing catalyst bed to which regenerated catalyst is continuously being added and from which spent catalyst is continuously being withdrawn. Another example of a continuous conversion system is the powdered or fluid-type system wherein the catalyst particle size is generally about 10 to 100 microns. In such a system the catalyst is suspended in hydrocarbon vapors in a reaction zone, then separated from said vapors, then stripped, and then suspended in an oxygen-containing gas for regeneration. Here, as in the moving bed system, the reaction chamber contains a mass of continuously moving catalyst material. Regenerated catalyst is continuously being added to the reactor and spent catalyst is continuously being withdrawn therefrom. In both continuous systems the problem of temperature control is extremely important and an object of my invention is to obtain extremely close temperature control and, at the same time, to utilize the exothermic heat of regeneration to supply endothermic heat of cracking.

An important problem in all systems of the class described is that of effectively stripping hydrocarbons from catalyst material prior to regeneration and effectively stripping regeneration gases from the catalyst prior to conversion. Catalyst particles are necessarily porous and they tend to occlude gases and vapors. It is difficult to remove such occluded gases and vapors from highly porous particles and for this reason (and for many other reasons) it is desirable to employ as small amount of porous catalyst material as possible for effecting a particular conversion. An object of my invention is to minimize the amount of highly porous particles and to thereby effect considerable savings in the construction and operation of a catalyst stripping section.

A further object of the invention is to provide an improved method and means for catalytically cracking heavy charging stock such as reduced crudes. A further object is to minimize the amount of heat which must be supplied to the charging stock in pipe stills or other preheaters and to provide a method and means whereby the heat of vaporization as well as the heat of cracking may be supplied in the catalytic conversion chamber itself or in a conduit leading thereto. Other objects of the invention will be apparent as the detailed description proceeds.

In practicing the invention I mix a conventional catalyst with a flowable heat retention medium which has practically no catalytic effect in the reaction but which absorbs and releases heat in the successive steps of regeneration and reaction, which prevents channeling, bridging, etc., and thus materially expedites the handling of catalyst material in continuous systems, and which simplifies and facilitates the stripping of catalyst subsequent to the reaction and regeneration steps respectively.

For a moving bed system this heat retention material may be iron shot, smooth quartz pebbles or particles of any other metal or material which does not melt or decompose or seriously affect the catalyst or reaction at temperatures of 850 to 1050° F. The particles of heat retention material should in this case be about the same size as the catalyst particles, i. e., about ⅛ inch in diameter. It should be understood, of course, that this heat retention material must not only withstand reaction temperatures up to 1050° F. but it must also withstand regeneration temperatures which may be somewhat higher.

For the powdered or fluid-type catalyst system the particle size of the heat retention material should likewise be about the same as the particle size of the catalyst material, i. e., about 10 to 100 microns. Powdered quartz or silica may be employed for this purpose or powdered metals or any other inert powdered material which will withstand the reaction and regeneration temperatures and which is possessed of the desired high specific heat. Active silica or silica gel is not desirable for such heat retention material if it possesses appreciable catalytic activity or if it is so highly porous that it interferes with the stripping steps. Crushed silica sand or other material which has little or no tendency to absorb gases and vapors, will not complicate the stripping problem and will, in fact, facilitate the stripping of the catalyst.

The amount of heat retention material employed with the catalyst will depend on the particular catalytic reaction, the nature of the charging stock, the nature and amount of catalyst material which is used, etc. In catalytic cracking for instance, the bulk density of iron shot or powdered iron may be somewhat higher than the bulk density of activated hydrosilicate of alumina or silica-alumina catalyst of about the same particle size. With such catalyst and with a gas oil charge I may use equal volumes of the heat retention material and catalyst. There is usually at least about .025 pound of carbon deposited for each pound of gas oil converted and when this amount of carbon is burned from the catalyst and heat retention material in the regeneration step it supplies the heat necessary for effecting the conversion. If larger amounts of carbonaceous material are deposited, the excess heat in the regeneration step may be carried off in flue gas or in any other conventional manner.

When reduced crude is employed as a charging stock considerably larger amounts of carbonaceous material are deposited on the catalyst and the heat recovered by the combustion of such deposits is considerably more than enough for effecting the conversion. In practicing my invention I utilize a considerable portion of this heat for effecting vaporization of the charging stock, i. e., I introduce at least a substantial portion of the charging stock into the conversion zone in the liquid state and effect both vaporization and cracking of this stock in the reaction chamber by means of the heat absorbed in the regeneration step in the catalyst-heat retention mixture. The use of the heat retention material for effecting vaporization as well as cracking is particularly advantageous in the powdered or fluid-type conversion system because in such a system the dense turbulent suspended catalyst phenomenon brings about a practically instantaneous equalization of temperature throughout the entire zone so that all parts of the conversion zone are at almost identically the same temperature regardless of the temperature of the gases, liquids or solids which are introduced thereto.

When heat of vaporization as well as heat of cracking is conveyed from the regeneration step to the reaction step by means of heat retention material I may employ larger amounts of the heat retention material. Generally speaking, I employ about ¼ to 4 volumes of heat retention material per volume of catalyst but considerably larger amounts of heat retention material may be used in reduced crude operations. The actual amount of heat retention material will, of course, be dependent upon its specific heat, its density, the nature of the catalyst and reaction involved, the type of equipment employed, etc.

An important feature of the invention is the ease of handling and stripping the catalyst which is brought about by the inclusion of about ¼ to 4 volumes of the heat retention material. The catalyst particles are necessarily porous and their outer surfaces are rough and jagged which tends to make the catalyst pack or bridge in conduits, particularly if there is any interruption in catalyst flow. I have discovered that by mixing heat retention material of the type described with these catalyst particles a fluent mass is obtained which is more evenly distributed in pipes and catalyst chambers, which is less inclined to stick or bridge, and which is by and large more easily handled.

The invention will be more clearly understood from the following description read in connection with the accompanying drawing which forms a part of this specification and in which Figure 1 is a schematic flow diagram of a powdered catalyst system employing my heat retention material;

Figure 2 is a vertical plan of a modified type of conversion or regeneration chamber;

Figure 3 is a vertical plan partly in section showing a continuous catalyst chamber in a moving bed system;

Figure 4 is a vertical plan of another modification of a continuous catalyst chamber for a moving bed system; and Figure 5 is a vertical plan illustrating another type of reactor or regenerator for a powdered catalyst system.

While the invention is applicable to endothermic catalytic processes generally, it will be described in detail in connection with the catalytic cracking of Mid-Continent gas oil or reduced crude over Super Filtrol, an activated hydrosilicate of alumina in which the ratio of silica to alumina is about 3.3 by weight or 5.63 by mols. The catalyst per se forms no part of the present invention and it will, therefore, not be described in great detail. The preferred catalyst for catalytic cracking is, however, a catalyst of the silica-alumina or silica-magnesia type. Such catalyst may be prepared by acid treating a bentonite clay. Alternatively, the catalyst may be prepared by coprecipitating silica with a metal oxide such as alumina, magnesia or the like. A preformed activated silica may be impregnated with alumina or magnesia or have such metal oxides adsorbed thereon. A silica hydrogel may be ball-milled with alumina or magnesia, dried and activated by heating to a temperature of about 1000° F. For dehydrogenation the catalyst is preferably a VIth group metal oxide such as chromium oxide or molybdenum oxide mounted on an activated alumina base. Various other metal oxides, promoters, etc., may be employed in connection with such catalysts as is well known to those skilled in the art.

Referring to Figure 1, the feed stock may be charged through line 10 to coils 11 in pipe still 12 and in the case of gas oil it may be vaporized and heated to a transfer line temperature of about 850 to 1000° F., preferably about 925° F. In the case of reduced crudes or even in the case of gas oil, the preheating may be to a much lower temperature and the charging stock may be only partially vaporized, in fact, the preheater may be entirely dispensed with and the vaporization may be effected by the heat contained in the catalyst-heat retention material mixture.

Transfer line 13 discharges into reactor 14 but en route to the reactor the mixture of catalyst and heat retention material, at a temperature of about 950 to 1050° F., may be added thereto from standpipe 15 in amounts regulated by valve 16. The catalyst in this case is in powdered form with a particle size of about 10 to 100 microns and I may employ about 1 to 10 parts by weight of catalyst to each part by weight of charging stock.

Associated with the catalyst is a heat retention material of approximately the same particle size as the catalyst material, about ¼ to 4 or more volumes of heat retention material being employed for each volume of catalyst. The introduction of this hot catalyst-heat retention material mixture into the transfer line causes the instantaneous vaporization of any unvaporized charging stock and the catalyst-heat retention material mixture is carried in suspension by said vapors and introduced at a low point in reactor 14.

Reactor 14 is preferably a vertical cylindrical vessel of such cross-sectional area that the upward vapor velocity therein will be about 0.4 to 4, preferably about 1½ to 2½ feet per second. At such a vapor velocity the catalyst is maintained in a dense turbulent suspended catalyst phase, the density of which may be about 10 to 25 pounds or more, usually about 15 to 18 pounds per cubic foot. The reactor should be of sufficient height to insure the contact of the vapors with the required amount of catalyst. At the vapor velocity above indicated this may require a reactor height of about 10 to 40 feet or more thus giving a vapor residence time in the reactor of about 4 to 40, usually about 10 to 15 seconds. The pressure in the reactor may be from about atmospheric to about 50 pounds per square inch and as a specific example the pressure at the base of the reactor may be about 15 pounds gauge and at the top of the reactor may be about 8 pounds gauge, this difference in pressure being accounted for by the head of catalyst in the dense turbulent suspended catalyst phase.

Above the dense turbulent suspended catalyst phase there is a light dispersed catalyst phase, the density of which may be up to about 4 pounds per cubic foot but which is usually much lighter. Reaction products are withdrawn from this light dispersed catalyst phase and passed through cyclone separators 17 in order to remove catalyst particles and heat retention material therefrom, this removed material being returned to the dense phase through cyclone dip legs 18. The cyclones may be of any desired type and may be connected in parallel or in series, or both in parallel and series. The dip legs should be of sufficient length to provide the necessary head for returning separated catalyst and heat retention materials and each of these dip legs may, of course, be provided with suitable valves, aeration means, blow lines, pressure indicators, etc. to insure smooth continuous operation.

Reaction products which are thus freed from catalyst particles are taken overhead through line 19 into a fractionating tower 20. This tower may be provided with a suitable reflux means 22 at its top, the conditions in the tower being so regulated as to remove products heavier than gasoline through line 23 and to remove gasoline and gases through line 24 to stabilizer 25.

The stabilizer may be provided with heating means 26 at its base and reflux means 27 at its top, gasoline being withdrawn through line 28 to storage and gases being withdrawn through line 29 for further use or refinement. The fractionation system has been schematically illustrated in the drawing and described but it should be understood that any conventional fractionation system may be employed with any number of fractionating columns, absorbers, stabilizers, etc., in accordance with well known refinery practice. Where steam is employed with the charging stock or is otherwise introduced into the system, it may be condensed from the overhead leaving tower 20 before the gasoline is separated from lighter hydrocarbons.

Spent catalyst continuously settles in reaction chamber 14 to a point below that at which vapors are introduced and this settled catalyst is withdrawn through standpipe 30 in amounts regulated by valve 31. Thus with a pressure of about 14 to 15 pounds in the base of the reactor the standpipe may be of sufficient height to give a pressure head at valve 31 of about 20 pounds per square inch. Catalyst and heat retention material is picked up by air introduced through line 32 at about 15 or 16 pounds per square inch and is carried through line 33 into regeneration chamber 34 which may be of the same general type as reaction chamber 14 but which is usually considerably larger in size. Here again the chamber is of such cross-sectional area that the vertical gas velocity therein will be about 0.4 to 4, preferably about 1½ to 2½ feet per second in order that the dense suspended turbulent catalyst phase may be maintained. The regenerator is preferably higher than the reactor and the gas contact time may be about 5 to 50 seconds or more but will, of course, be dependent upon the amount of carbonaceous material that has to be burned.

Spent regeneration gases are withdrawn from the light dispersed catalyst phase at the top of the regeneration chamber through cyclone separators 35 which may be of any type and may be employed in parallel or series, or both. Dip legs 36 may extend from these separators to the dense turbulent suspended catalyst phase for returning separated solids thereto. The regeneration gases which have thus been freed from solids are withdrawn through line 37. These gases may be passed through a heat exchanger, waste heat boiler, turbine, or any other suitable device in order that their heat and energy content may be utilized and residual traces of catalyst and heat retention material may be recovered therefrom by means of an electrostatic precipitator or a conventional scrubber.

The catalyst which settles below the gas inlet in the regenerator is withdrawn through standpipe 15 in amounts regulated by valve 16 as hereinabove described. It is essential that catalyst in the base of the reactors and in standpipes should be maintained in fluent form and steam is therefore introduced immediately above valve 16 through line 38 for effecting the necessary aeration. The vertical velocity of such steam in the standpipe is very low, usually of the order of about .3 to .03 foot per second. In addition to the aeration of this catalyst it is essential that it be stripped from oxygen-containing compounds and I, therefore, introduce additional steam through line 39 at the base of the regenerator itself. The heat retention material is relatively non-porous and it, therefore, does not aggravate but, in fact, facilitates the stripping. In other words, a much lesser amount of steam is required for stripping gases from the heat retention material than would be required for stripping gases from an equivalent amount of porous catalyst material.

Similarly, aeration steam is introduced through line 40 at the base of standpipe 30 and stripping steam is introduced through line 41 into the base of the settled catalyst in reaction chamber 14. Effective stripping at this point is even more essential than in the case of regenerated catalyst because all possible hydrocarbon material should be removed from spent catalyst before this catalyst is regenerated.

The temperature in the reactor may be anywhere from about 850 to 1000° F. but is usually about 900 to 950° F. so that the catalyst and heat retention material is withdrawn through standpipe 30 and introduced into the regenerator at about this temperature. The temperature in the regenerator is usually about 950° to 1050° F., preferably about 1000° F., so that the catalyst and the heat retention material withdrawn therefrom will be at this higher temperature. The difference in sensible heat of the catalyst and heat retention material, between the temperature level in the reactor and the temperature level in the regenerator is usually sufficient to effect the endothermic heat of cracking and it may be sufficient to effect the vaporization of the charging stock as well. While certain temperature ranges have been described in the reactor and regenerator it should be understood that each of these chambers is of substantially uniform temperature throughout, there is no appreciable temperature gradient nor temperature differential between consecutive zones in either of these reactors.

In Figure 2 I have shown a modified reactor or regenerator in which there is a catalyst over-flow from the top of the dense turbulent suspended catalyst phase into standpipe 30A. In this case, as in the case of Figure 1, stripping steam is introduced through line 41 and aeration steam through line 40.

In Figures 3 and 4 I have illustrated my invention as applied to moving bed continuous catalyst cracking systems. Referring to Figure 3, a large number of tubes 43 may be mounted in any suitable shell or casing (diagrammatically indicated by a side wall 44). Partition 45 spaced from the top and a partition 46 spaced from the bottom respectively may form gaseous feed and discharge chambers for the whole nest of tubes, the gases either being introduced through line 47 and discharged through line 48 or introduced through line 48 and discharged through line 47. If desired, hot flue gases or other hot fluids may be introduced through line 49 and discharged through line 50 or vice versa. If gases are introduced through line 48 into the space between wall 46 and the bottom of the chamber, these gases enter the catalyst tubes through slots 51 and leave the catalyst tubes through slots 52 and finally leave the chamber through line 47.

Heretofore a large number of tubes 43, each of small diameter, have been required in order to obtain temperature control and heat for the reaction. Use of my heat retention material makes possible the use of large diameter tubes and, in fact, makes possible the total elimination of the heat transfer medium, lines 49 and 50, etc.

Catalyst may be introduced into tube 43 from a hopper (not shown) above shell 44 which is preferably closed to the atmosphere to prevent the escape of gases. Flow of the catalyst through the tube is controlled by valve 53 which is preferably of the modified rotary plug valve type. The plug has a deeply recessed cup on one side. When it is intermittently or continuously rotated the cup alternately fills and empties thus transferring catalyst at a definite rate from above to below the valve. The particular feature of this valve is its minimizing of the crushing action which rules out most valves designed for this purpose. The function of this valve is not only to insure accurately controlled catalyst discharge but also to prevent the escape of any gases from catalyst tubes 43.

The catalyst discharged from valve 53 falls into stripping zone 43A into which stripping steam is introduced through line 41 and from which the stripping gases are removed through line 42. Here again the heat retention material facilitates stripping and requires far less steam than would be required if an equal amount of porous material were employed. Also, the heat retention material facilitates the flow of catalyst through the tubes, valves, etc., and tends to prevent any bridging or sticking of the catalyst therein.

In the modification shown in Figure 4, there is a gas-tight hopper above chamber 44' and also a gas-tight catalyst receiver 44A' below this chamber. The catalyst is introduced into tube 43' through nipples 54, the gases entering or leaving the tube 43' through the annular space between the tube and the nipple. Instead of a rotary valve at the bottom of the tube there is a funnel shaped member 55 with a movable plate 56 spaced from the small end thereof. By reciprocating or shaking this plate the flow of catalyst through the tube may be accurately controlled. Gases enter or leave the bottom of tube 43' through the annular space between vertical walls of funnel member 55 and the lower end of tube 43'. Here again stripping steam is introduced into the receiver 44A' through line 41 and this steam and the recovered hydrocarbons are withdrawn through line 42. Unless the pressure in the stripping section is as high or higher than the pressure in the reaction section there will, of course, be a possibility of reactants by-passing catalyst-containing tube 43' and leaving 44A' with stripping steam through line 42; obviously this may be avoided by maintaining the pressure in section 44A' slightly higher than the pressure in tube 43'.

In the continuous systems illustrated by Figures 3 and 4, the catalyst regeneration may be effected in a separate zone from the catalytic cracking but in this case, as in the previous cases, the heat retention material serves to regulate and stabilize both the temperature of catalytic cracking and the temperature of regeneration. The catalyst may, for instance, be regenerated in apparatus of the same type as illustrated in Figures 3 and 4, thus avoiding the cumbersome and expensive rotary kiln or wedge-type clay burners that have heretofore been suggested. Hot catalyst at a temperature of about 950 to 1000° F. may then be reintroduced into the hopper and passed through tubes 43 or 43' for further catalytic conversion.

In Figure 5 I have illustrated still another form of cracking or regeneration chamber for use in a powdered catalyst system. In this embodiment an enlarged catalyst separation chamber 57 is superimposed above the reactor 14B or regenerator and suspended catalyst leaves the top of the reactor through funnel-shaped member 58 which discharges against baffle 59. The bulk of the catalyst settles out of the reaction products in chamber 57 and is aerated with steam introduced through line 41 and any suitable distributing means such as perforated annular ring 41'.

The space velocity, catalyst retention time, catalyst-to-oil ratio, etc., employed in any of the above described modifications may vary within relatively wide limits depending upon the nature of the catalyst, the charging stock and the desired conversion. In powdered catalyst systems the weight ratio of regenerated catalyst (excluding heat retention material) to oil introduced, for example in line 13, may be about 1:1 to 16:1 but is preferably about 4:1. The powdered catalyst retention time in the reactor may range from about 1 to 20 minutes or more but is preferably about 5 minutes. In the moving bed system I may employ a space velocity of about .4 to 4, preferably about 1.0, liquid volumes of oil per hour per volume of catalyst (exclusive of heat retention material) in that portion of the moving bed which is in the reaction zone and the catalyst may be retained in the reaction zone for a period ranging from a few minutes to an hour or more, preferably about 20 minutes.

No invention is claimed in any specific reactor or regenerator design and it should be understood that still other modifications may be employed. For example, the lower end of the standpipe 30, 30A, or 30B may discharge directly into the lower part of the regenerator. Or the lower end of standpipe 15 may discharge directly into the base of reaction vessel 14. It is not essential that charging stock or regeneration gases pick up the catalyst and heat retention material en route to the reactor and regenerator respectively since such charging stock or regeneration gas may be separately introduced in either case. Catalyst and heat retention material may be introduced into either chamber by means of steam. If additional vapors are necessary in order to maintain the dense turbulent suspended catalyst phase in the reactor, I preferably employ steam. In the regenerator additional gases may be supplied by recirculating a portion of the regeneration gases.

My invention is also applicable to the dehydrogenation of naphtha or hydrocarbon gases or heavier hydrocarbon oils. For dehydrogenation my catalyst is preferably magnesium chromite, molybdenum oxide-on-alumina, or chromium-oxide-on-alumina. Here again, however, it should be understood that any conventional catalyst may be used. The general arrangement of apparatus and the sequence of process steps may be the same in catalytic dehydrogenation as for catalytic cracking except that temperatures and pressures will, of course, be dependent upon the nature of the particular stock undergoing dehydrogenation and the nature of the catalyst employed. Generally speaking, I prefer to effect dehydrogenation under higher pressure and in the presence of a recycled gas rich in hydrogen.

The heat retention material hereinabove described should not be confused with catalyst carriers heretofore employed. Catalyst carriers depend upon their rough or absorbent surfaces and their porosity, their ability to adsorb or carry the catalyst material and to effect intimate contact between said material and gases undergoing treatment. My heat retention material on the other hand, is preferably a dense, hard, smooth, inert material of high specific heat, a material which is inert with respect to the catalyst and the reaction but which exerts its beneficial effect in controlling the temperature of the reaction and regeneration, in promoting flowability of the catalyst and in preventing channeling, bridging, etc., in the catalyst mass. While I have described preferred embodiments of my invention it should be understood that I do not limit myself to such details except as defined by the following claims.

I claim:

1. The method of obtaining temperature control in a continuous catalytic conversion system which comprises admixing with a catalyst at least 25% by volume of a dense non-combustible heat retention material of high specific heat having a particle size about the same as that of the particle size of the catalyst material and being inert toward the catalyst and the catalytic reaction, continuously introducing such a mixture of catalyst and heat retention material at a temperature of about 950 to 1050° F. into a reaction zone, maintaining the temperature of the reaction zone lower than the temperature of the introduced mixture whereby the sensible heat of said mixture supplied endothermic heat of conversion and continuously removing spent catalyst and heat retention material from said reaction zone.

2. The method of claim 1 wherein the particle size of the catalyst and heat retention material is about ⅛ inch and wherein the mixture passes through the reaction zone in the form of a moving bed.

3. The method of claim 1 wherein the particle size of the mixture is about 10 to 100 microns and wherein the catalyst in the reaction zone is maintained as a dense suspended turbulent catalyst phase.

4. The method of continuously regenerating a catalyst material which has become coated with a carbonaceous deposit which method comprises having admixed with said catalyst at least about 25% by volume of a dense non-combustible heat retention material of high specific heat having a particle size about the same as that of the particle size of the catalyst material, continuously introducing said mixture at a temperature below about 950° F. into a regeneration zone, maintaining a temperature in the regeneration zone of about 950 to 1050° F. and continuously removing catalyst at about said temperature from said regeneration zone.

5. The method of claim 4 wherein the particle size of the catalyst and heat retention material is about 10 to 100 microns.

6. A catalytic hydrocarbon conversion process which comprises contacting hydrocarbon vapors with a mass of moving catalyst particles in a contacting zone maintained at a temperature of about 850 to 1000° F., continuously adding catalyst to said zone and continuously withdrawing catalyst from said zone whereby a substantially constant quantity of catalyst is retained in said zone, continuously regenerating the withdrawn catalyst at a temperature of about 950 to 1050° F., continuously adding catalyst to and withdrawing catalyst from said regeneration zone, the catalyst withdrawn from the regeneration zone being added to the conversion zone at a temperature substantially higher than the temperature maintained in the conversion zone, said catalyst being admixed with sufficient dense non-combustible heat retention material of high specific heat and of a particle size about the same as the particle size of the catalyst material, so that the temperature in the regeneration zone is maintained within safe limits and so that the sensible heat absorbed by the catalyst and heat retention material in the regeneration zone supplies endothermic heat of conversion in said conversion zone.

7. The process of claim 6 which includes the step of stripping with steam the catalyst removed from the conversion zone before said catalyst is introduced into the regeneration zone.

8. The method of operating a hydrocarbon conversion system which comprises employing a mixture of a catalyst material with at least about 25% by volume of an inert dense non-combustible heat retention material having a particle size about the same as the particle size of the catalyst material, depositing carbonaceous matter on the catalyst material, adding heat to said catalyst and heat retention material by burning said carbonaceous deposits from the catalyst in a regeneration zone, utilizing at least a substantial part of said added heat for effecting endothermic conversion of hydrocarbons in the conversion zone whereby carbonaceous material is again deposited on the catalyst material, removing catalyst and heat retention material from the conversion zone, stripping said mixture with steam for removing hydrocarbons absorbed by the catalyst and returning the stripped mixture to said regeneration zone.

9. The method of continuously operating a catalytic hydrocarbon conversion system which comprises regenerating catalyst particles which have become coated with carbonaceous deposits in the presence of at least 25% by volume of a dense non-combustible heat retention material having a particle size about the same as the particle size of the catalyst material whereby a part of the heat of combustion is absorbed in the mixture of catalyst and heat retention material, stripping said hot mixture, continuously contacting said hot stripped mixture of catalyst and heat retention material with a hydrocarbon charging stock whereby a part of the absorbed heat in the catalyst and heat retention material is utilized for effecting hydrocarbon conversion and carbonaceous deposits are once more formed on the catalyst, stripping the mixture of coated catalyst and heat retention material to remove hydrocarbons therefrom, introducing the stripped mixture of heat retention material and coated catalyst from the conversion step to the regeneration step and maintaining the regeneration step at a sufficiently higher temperature than the conversion step so that the heat absorbed by the catalyst and heat retention material in the regeneration step supplies endothermic heat of conversion in the conversion step.

10. The method of claim 9 which includes the further step of vaporizing at least a portion of the charging stock by the heat contained in the catalyst-heat retention material mixture leaving said regeneration zone.

11. The method of catalytically cracking a heavy hydrocarbon of the type exemplified by reduced crude which method comprises preheating a mixture of powdered catalyst and powdered heat retention material to a temperature of about 950 to 1050° F., contacting said charging stock with said preheated mixture in a reaction zone, maintaining constant catalyst motion in said reaction zone, continuously adding substantial amounts of said preheated catalyst-heat retention material to said zone, and continuously withdrawing a substantially equivalent mixture of spent catalyst and heat retention material from said zone.

12. The method of obtaining temperature control in a continuous catalytic conversion system which comprises admixing with solid catalyst particles at least about 25% by volume of a dense non-combustible heat retention material of high specific heat having a particle size about the same as that of the particle size of the catalyst material and being inert toward the catalyst and the catalytic reaction, continuously introducing such mixture of catalyst and heat retention material into an endothermic reaction zone, continuously removing such mixture of catalyst and heat retention material from said reaction zone at such a rate as to maintain a substantially constant amount of catalyst in said reaction zone, heating said mixture of catalyst and heat retention material in a zone outside said reaction zone and returning to said reaction zone the externally heated mixture of catalyst and heat retention material at a temperature which is higher than the temperature in the reaction zone whereby the sensible heat of said mixture supplies endothermic heat of conversion in said reaction zone.

13. The method of continuously regenerating and utilizing a catalyst material which becomes coated with carbonaceous deposits which method comprises having admixed with said catalyst at least about 25% by volume of a dense non-combustible heat retention material of high specific heat having a particle size about the same as that of the particle size of the catalyst material, continuously introducing said mixture at a temperature substantially below regeneration temperature into a regeneration zone, maintaining a temperature in the regeneration zone which is substantially higher than the temperature of catalyst-heat retention material mixture introduced thereto and also higher than the temperature of the conversion zone, continuously removing catalyst from the regeneration zone and introducing it into the conversion zone at a temperature higher than the average temperature in the conversion zone and continuously removing catalyst from the conversion zone for introduction into the regeneration zone.

14. The method of operating a hydrocarbon conversion system which comprises employing a mixture of catalyst material with at least about 25% by volume of an inert dense non-combustible heat retention material having a particle size about the same as the particle size of the catalyst material, depositing carbonaceous material on the catalyst material in an endothermic conversion zone, withdrawing said mixture of heat retention material and catalyst with deposited carbon from said endothermic conversion zone and introducing it into a regeneration zone, maintaining said regeneration zone at a higher temperature than the temperature of said withdrawn mixture, adding heat to said catalyst and heat retention material by burning said carbonaceous deposits in said regeneration zone, removing regenerated catalyst from the regeneration zone and returning it to the conversion zone at a temperature which is higher than the average temperature in said conversion zone and utilizing at least a substantial part of the added heat for effecting endothermic conversion with hydrocarbons in a conversion zone whereby carbonaceous material is again deposited on the catalyst material and the catalyst material is again cooled for a repetition of the cycle.

ERNEST W. THIELE.